United States Patent
Yousef et al.

(10) Patent No.: US 12,258,441 B1
(45) Date of Patent: Mar. 25, 2025

(54) FABRICATION OF A CONJUGATED POLYMER

(71) Applicant: IMAM MOHAMMAD IBN SAUD ISLAMIC UNIVERSITY, Riyadh (SA)

(72) Inventors: Tarek Ahmed Yousef, Riyadh (SA); Saad Shaaban, Riyadh (SA); Ahmed Abdel Nazeer Soliman, Riyadh (SA); Mohamed Alaa Mohamed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/674,496

(22) Filed: May 24, 2024

(51) Int. Cl.
*C08G 61/12* (2006.01)
*H01G 11/32* (2013.01)
*H01G 11/48* (2013.01)

(52) U.S. Cl.
CPC ........ *C08G 61/124* (2013.01); *H01G 11/32* (2013.01); *H01G 11/48* (2013.01);
(Continued)

(58) Field of Classification Search
CPC ............... C08G 61/124; C08G 61/126; C08G 2261/124; C08G 2261/1412;
(Continued)

(56) References Cited

U.S. PATENT DOCUMENTS

| | | | | |
|---|---|---|---|---|
| 6,197,922 B1 * | 3/2001 | Mohwald | ............... | C08G 79/00 427/407.1 |
| 2009/0227764 A1 * | 9/2009 | Heeney | ............... | C08G 61/123 252/301.16 |

(Continued)

FOREIGN PATENT DOCUMENTS

| | | | |
|---|---|---|---|
| CN | 102820430 A | 12/2012 | |
| CN | 103804657 A | 5/2014 | |

(Continued)

OTHER PUBLICATIONS

Pander et al. ( J. Phys. Chem. C 2017, 121, 11027-11036).*

(Continued)

*Primary Examiner* — Shane Fang
(74) *Attorney, Agent, or Firm* — Oblon, McClelland, Maier & Neustadt, L.L.P.

(57) ABSTRACT

A method of fabricating a conjugated polymer may include alkylating a carbazole with an alkyl bromide, in a solvent mixture, to form an alkyl carbazole; brominating the alkyl carbazole to form an N-alkyldibromocarbazole; and reacting the N-alkyldibromocarbazole with a distanyl-biselenophene in the presence of a catalyst to form a conjugated polymer having repeating units of formula (5)

(Continued)

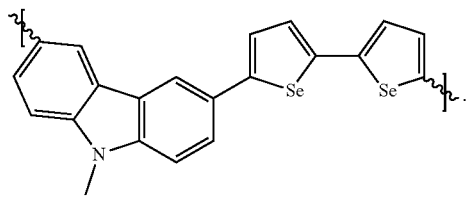

(5)

16 Claims, 2 Drawing Sheets

(52) U.S. Cl.
CPC .................. *C08G 2261/124* (2013.01); *C08G 2261/1412* (2013.01); *C08G 2261/3225* (2013.01); *C08G 2261/3241* (2013.01); *C08G 2261/413* (2013.01); *C08G 2261/516* (2013.01)

(58) Field of Classification Search
CPC .... C08G 2261/3225; C08G 2261/3241; C08G 2261/413; C08G 2261/516; C08G 2261/1646; C08G 2261/18; C08G 2261/3246; C08G 2261/91; H01G 11/32; H01G 11/48; H10K 85/654; H10K 85/656; H10K 85/6576; H10K 85/6572; H10K 85/113; H10K 85/6574; H10K 30/82

See application file for complete search history.

(56) References Cited

U.S. PATENT DOCUMENTS

| 2013/0032209 A1* | 2/2013 | Kim .................... C08G 61/126 257/E51.026 |
| 2022/0093997 A1 | 3/2022 | Valeska Lotsch et al. |

FOREIGN PATENT DOCUMENTS

| CN | 111233898 B | 5/2021 |
| KR | 2012111203 A | 10/2012 |

OTHER PUBLICATIONS

Piotr Pander, et al., "Electrochromic properties of novel selenophene and tellurophene derivatives based on carbazole and triphenylamine core", The Journal of Physical Chemistry C, vol. 121, Issue 21, Jun. 2017, pp. 11027-11036.

Sukrawee Pansay, et al., "Multibromo-N-alkylcarbazoles: synthesis, characterization, and their benzo[b]thiophene derivatives", Tetrahedron Letters, vol. 53, Issue 34, Aug. 2012, pp. 4568-4572.

* cited by examiner

FABRICATION OF A CONJUGATED POLYMER

STATEMENT OF ACKNOWLEDGEMENT

Support provided by the Imam Mohammad Ibn Saud Islamic University (IMSIU) is gratefully acknowledged.

BACKGROUND

Technical Field

The present disclosure is directed toward conjugated polymers, more particularly, directed toward a method for producing conjugated polymers for use in electrode/supercapacitors.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

In recent years, there has been an escalating requirement for higher power and energy densities because of the rapidly growing market of hybrid electric vehicles and portable electronic devices. The currently dominating energy storage devices (ESDs) are batteries and supercapacitors however, batteries demonstrate limited cycle performance and power density. Supercapacitors are an electrical energy storage technology undergoing extensive developments in the last years. Supercapacitors are capable of storing electrical charges in redox-active porous polymers. In the energy-power spectrum, supercapacitors take an intermediate place between batteries and dielectric capacitors, delivering higher power densities than the former and higher energy densities than the latter. Supercapacitors can store 10 to 100 times more energy per unit volume or mass than batteries. Although supercapacitors present lower energy densities than batteries, they possess numerous assets that batteries do not, primarily a lengthened duration of use. They also feature the ability to rapidly charge, a wider temperature range, environmental friendliness, better safety, higher reliability, and maintenance-free operation.

An electrode is a conductor that is used to make contact with a nonmetallic part of a circuit. Electrodes are commonly used in electrochemical cells, semiconductors, and medical devices. A suitable electrode material should have high specific capacitance, low resistance, high surface area, and high chemical and thermal stability. Cost-effectiveness and material toxicity should also be considered. Presently, electrodes produced for supercapacitors are generally manufactured using printing techniques. Printing techniques include casting, inkjet printing, and spray painting with a template or by freehand. The process of printing an electrode involves applying layers of conductive and/or insulating ink to substrates to form films, then drying the films. The films are generally deposited on substrates comprising a ceramic or a plastic. Conventional methods for making supercapacitor electrodes, however, are inefficient, detrimental to the environment, and expensive.

Accordingly, it is one object of the present disclosure to provide an efficient, environmentally friendly, and cost-effective method for fabricating conjugated polymers to be used in the production of electrodes.

SUMMARY

In one embodiment, a method of fabricating a conjugated polymer is described. The method comprises alkylating a carbazole with an alkyl bromide, in a solvent mixture, to form an alkyl carbazole; brominating the alkyl carbazole to form an N-alkyldibromocarbazole; and reacting an N-alkyldibromocarbazole with a distanyl-biselenophene in a presence of a catalyst to form a conjugated polymer having repeating units of Formula 5:

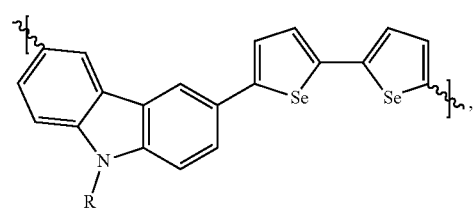

(5)

wherein R is hydrogen, an alkyl group, or a halo group.

In some embodiments, the catalyst is a metal catalyst.

In some embodiments, the catalyst comprises palladium.

In some embodiments, the carbazole is 9H-carbazole.

In some embodiments, the solvent mixture comprises an organic solvent and a strong base.

In some embodiments, the strong base is KOH.

In some embodiments, the organic solvent is selected from the group consisting of dimethylsulfoxide (DMSO), dimethylformamide (DMF), acetonitrile, ethanol, and n-methyl-2-pyrrolidone (NMP).

In some embodiments, the organic solvent is DMSO.

In some embodiments, the alkyl carbazole is 9-hexyl-9H-carbazole.

In some embodiments, the alkyl bromide is 1-bromohexane.

In some embodiments, the distanyl-biselenophene is 5,5'-bis(trimethylstannyl-2,2'-biselenophene).

In some embodiments, the method further comprises mixing the N-alkyldibromocarbazole, the distanyl-biselenophene, an organic solvent, and an inorganic salt to form a first mixture; combining the first mixture with the catalyst and a metal halide to form a second mixture; and stirring the second mixture to form the conjugated polymer.

In some embodiments, the inorganic salt is selected from the group consisting of sodium fluoride (NaF), calcium fluoride (CaF), potassium fluoride (KF), lithium fluoride (LiF), and cesium fluoride (CsF).

In some embodiments, the second mixture is stirred at a temperature of 40 to 80° C. under an inert gas flow for 15 to 21 hours (h).

In some embodiments, the inert gas is Ar.

In some embodiments, the second mixture is stirred at a temperature of 60° C. for 18 h.

In some embodiments, the first mixture comprises a molar ratio of the N-alkyldibromocarbazole to the distanyl-biselenophene of 0.5-1.5:0.45-0.85.

In some embodiments, the molar ratio is 1:0.6.

In some embodiments, the metal halide is copper (I) iodide.

In another embodiment, an electrode having a layer comprising the conjugated polymer made by the above-mentioned process and graphene is described.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
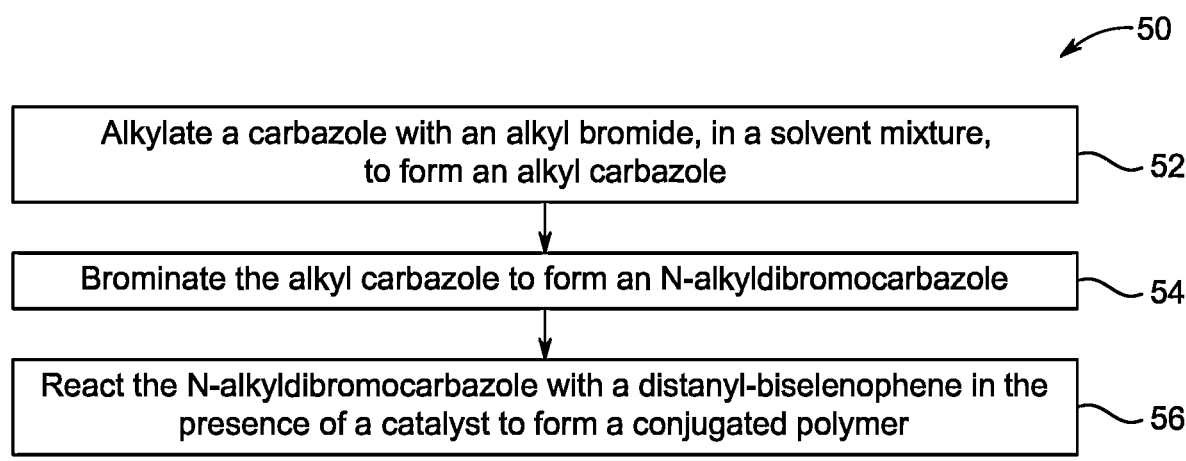
FIG. 1 is a flowchart depicting a method of fabricating a conjugated polymer, according to certain embodiments.
Figure 2:
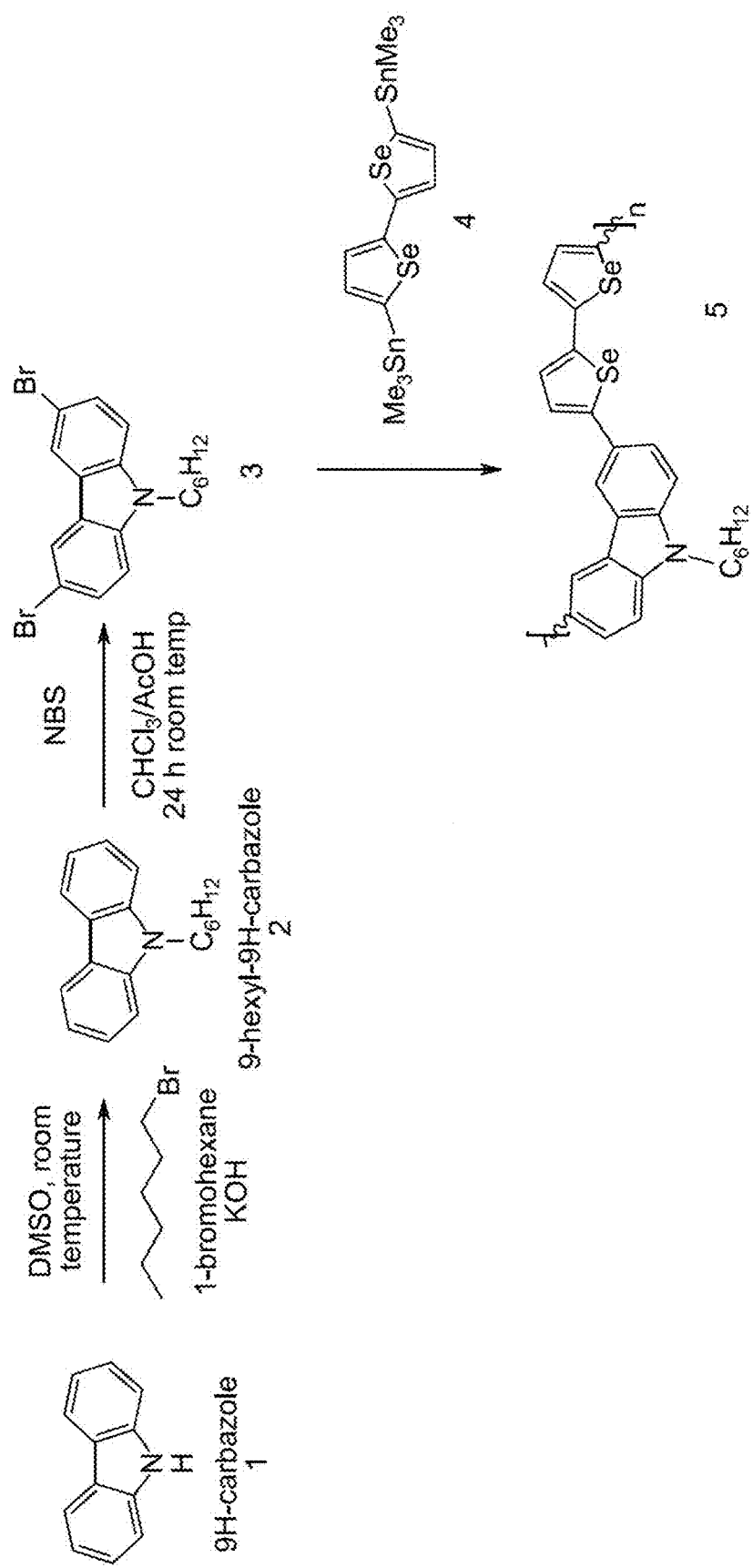
FIG. 2 is a schematic illustration of a reaction scheme for fabricating the conjugated polymer by reacting an N-alkyldibromocarbazole with a distanyl-biselenophene, according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the term "tautomer" refers to constitutional isomers of organic compounds that readily convert by tautomerization or tautomerism. The interconversion commonly results in the formal migration of a hydrogen atom or proton, accompanied by a switch of a single bond and adjacent double bond. Tautomerism is a special case of structural isomerism, and because of the rapid interconversion, tautomers are generally considered to be the same chemical compound. In solutions in which tautomerization is possible, a chemical equilibrium of the tautomers will be reached. The exact ratio of the tautomers depends on several factors comprising, but not limited to, temperature, solvent and pH. Exemplary common tautomeric pairs include, but are not limited to, ketone and enol, enamine and imine, ketene and ynol, nitroso and oxime, amide and imidic acid, lactam, and lactim (an amide and imidic tautomerism in heterocyclic rings), and open-chain and cyclic forms of an acetal or hemiacetal (e.g., in reducing sugars).

As used herein, the term "stereoisomer" refers to isomeric molecules that have the same molecular formula and sequence of bonded atoms (i.e., constitution) but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-)isomers, and non-enantiomeric optical isomers. Diastereomers seldom have the same physical properties. In terms of the present disclosure, stereoisomers may refer to enantiomers, diastereomers, or both.

Conformers, rotamers, or conformational isomerism refers to a form of isomerism that describes the phenomenon of molecules with the same structural formula but with different shapes due to rotations around one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the double bonds, ring systems, stereogenic centers, and the like can all be present in the compounds, and all such stable isomers are contemplated in the present disclosure. Cis- and trans- (or E- and Z-)stereoisomers of the compounds of the present disclosure wherein rotation around the double bond is restricted, keeping the substituents fixed relative to each other, are described and may be isolated as a mixture of isomers or as separated isomeric forms. S- and R- (or L- and D-)stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example, by chromatography, fractional crystallization, or use of a chiral agent.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from the exemplary group comprising, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group comprising, but not limited to, alkyl, aryl or arylalkyl), alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aralkylthiono, alkylsulfonyl, arylsulfonyl, arylalkylsulfonyl, sulfonamide (e.g. —SO$_2$NH$_2$), substituted sulfonamide, nitro, cyano, carboxy, carbamyl (e.g. —CONH$_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof and the like. The substituents may themselves be optionally substituted, and may be either unprotected, or protected as necessary, as known to those skilled in the art.

As used herein, the term "alkyl" unless otherwise specified refers to both branched and straight chain saturated aliphatic primary, secondary, and/or tertiary hydrocarbons of typically $C_1$ to $C_{20}$, preferably $C_6$-$C_{18}$, more preferably $C_{10}$-$C_{16}$, for example $C_1$, $C_2$, $C_3$, $C_4$, $C_5$, $C_6$, $C_7$, $C_8$, $C_9$, $C_{10}$, $C_{11}$, $C_{12}$, and specifically comprises, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl.

As used herein, the term "optionally comprises substituted alkyl groups" refers to moieties with which the alkyl group can be substituted. The substituent may be selected from the group comprising, but not limited to, hydroxyl, amino, alkylamino, arylamino, alkoxy, aryloxy, nitro, cyano, sulfonic acid, sulfate, phosphonic acid, phosphate, halo, or phosphonate or mixtures thereof. The substituted moiety may be either protected or unprotected as necessary, and as known to those skilled in the art.

As used herein, the term "metal catalyst" refers to a catalyst comprising a metal or agglomerates of more than one metal, deposited on a solid carrier material. Exemplary metals include metals located in Groups 3 through 12 of the periodic table such as, iron (Fe), zinc (Zn), vanadium (V), copper (Cu), manganese (Mn), chromium (Cr), scandium (Sc), titanium (Ti), gold (Au), silver (Ag), palladium (Pd), cadmium (Cd), molybdenum (Mb), and cobalt (Co).

As used herein, the term "solution" may be defined as a homogeneous mixture of two more substances.

As used herein, the term "solvent" may be considered as a substance, preferably liquid, that dissolves other substances to form a solution.

As used herein, the term "organic solvent" refers to organic compounds that can dissolve other substances, for example, aromatic compounds such as benzene.

The present disclosure is further intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}C$ and $^{14}C$, isotopes of nitrogen include $^{15}N$, and isotopes of oxygen include $^{17}O$ and $^{18}O$. Isotopically labeled compounds of the disclosure can generally be prepared by conventional techniques known to those skilled in the art or by processes and methods analogous to those described herein, using an appropriate isotopically-labeled reagent in place of the non-labeled reagent otherwise employed.

Aspects of the present disclosure are directed at developing electrode materials of porous conjugated organoselenium polymers for supercapacitor applications. The fabricated polymeric composites feature a highly conjugated backbone, tunable micropores, conducting nature, elevated thermal stability, and a large surface area.

A method 50 of fabricating a conjugated polymer is described. The order in which the method 50 is described is not intended to be construed as a limitation, and any number of the described method steps can be combined in any order to implement the method 50.

Additionally, individual steps may be removed or skipped from the method 50 without departing from the spirit and scope of the present disclosure.

At step 52, the method 50 comprises alkylating a carbazole with an alkyl bromide, in a solvent mixture, to form an alkyl carbazole. The carbazole is a compound represented by the Formula (I),

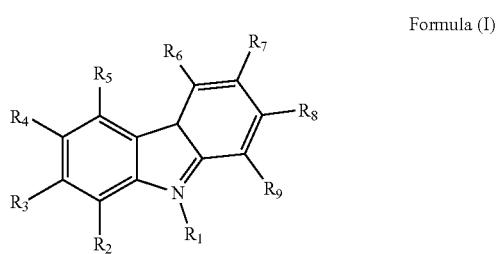

Formula (I)

Where $R_1$, $R_2$, $R_3$, $R_4$, $R_5$, $R_6$, $R_7$, $R_8$ and $R_9$ are each independently selected from hydrogen, alkyl, and halo groups. In some embodiments, each of these groups may be optionally substituted. In a preferred embodiment, $R_1$, $R_2$, $R_3$, $R_4$, $R_5$, $R_6$, $R_7$, $R_8$, and $R_9$ are each hydrogen, representing a 9H-carbazole. The alkylation is carried out in the presence of a solvent mixture.

The solvent mixture comprises an organic solvent and a base. Suitable organic solvents include, dimethylsulfoxide (DMSO), dimethylformamide (DMF), acetonitrile, ethanol, and n-methyl-2-pyrrolidone (NMP). Bases may be organic or inorganic and can preferably completely dissolve in water and have a pH value between 9 to 14. Suitable bases include, sodium carbonate ($Na_2CO_3$), potassium carbonate ($KHCO_3$), sodium hydroxide (NaOH), potassium hydroxide (KOH), sodium tert-butoxide (($CH_3$)$_3$CONa), and potassium tert-butoxide ($C_4H_9KO$). In a preferred embodiment, the solvent mixture comprises DMSO and KOH. The molar ratio of the carbazole is in the range of 1 to 20 mM, preferably 2 to 19 mM, preferably 3 to 18 mM, preferably 4 to 17 mM, preferably 5 to 16 mM, preferably 6 to 15 mM, preferably 7 to 14 mM, preferably 8 to 13 mM, preferably 9 to 12 mM, most preferably 10 mM. The molar ratio of the strong base in the solvent mixture is in the range of 1 to 20 mM, preferably 2 to 18 mM, preferably 5 to 15 mM, preferably 10 to 15 mM, preferably 12 to 15 mM, preferably 15 mM. The alkylation is preferably carried out in a nitrogen atmosphere.

The carbazole of Formula (I), reacts with the alkyl bromide to obtain a 9-hexyl-9H-carbazole. The molar ratio of the carbazole to the alkyl bromide is in the range of 5:1 to 1:5, preferably 4:1 to 1:4, preferably 3:1 to 1:3, preferably 2:1 to 1:2, preferably 1.5:1 to 1:1.5, preferably 1:1.2. The alkylation may be carried out using any suitable means of agitation, such as an agitator, a vortexer, a rotary shaker, a magnetic stirrer, a centrifugal mixer, an overhead stirrer, or an ultrasonic probe. Alternatively, the reaction mixture may be placed in an ultrasonic bath, preferably at room temperature, to obtain the alkyl carbazole. The alkyl carbazole may be isolated from the final reaction mixture using methods known to one skilled in the art, such as filtration, work-up, extraction with organic solvents, distillation, crystallization, column chromatography, and high-performance liquid chromatography (HPLC).

At step 54, the method 50 comprises brominating the alkyl carbazole to form an N-alkyldibromocarbazole. The bromination of alkyl carbazole can be carried out with a suitable brominating agent. Suitable brominating agents include, but are not limited to, N-bromoimides such as N-bromophthalimide, N-bromoacetamide, and, in particular, N-bromosuccinimide (NBS). In a preferred embodiment, the brominating agent is NBS. The molar ratio of the alkyl carbazole with the bromating agent is in the ratio of 1:5 to 5:1, preferably 1:4 to 4:1, preferably 1:3 to 3:1, preferably 1:2 to 2:1, most preferably 1:2.1.

The bromination is carried out in the presence of a solvent or a solvent mixture comprising two or more solvents. In a preferred embodiment, the bromination is carried out in the presence of the solvent mixture, comprising carbon tetrachloride, benzene, petroleum ether, heptane, toluene, acetic anhydride, ethyl acetate, dioxane, tri-n-butylamine, acetic acid, or a combination thereof. In a preferred embodiment, the solvent mixture comprises chloroform and acetic acid. In some embodiments, the volume ratio of chloroform to acetic acid is in the range of 4:1 to 1:4, preferably 3:1 to 1:3, most preferably 3:1 to 3.5:1. In some embodiments, the bromination may be carried out in the absence of a solvent or by any other methods conventionally known in the art. The bromination may be carried out using any suitable means of agitation, for example, an agitator, a vortexer, a rotary shaker, a magnetic stirrer, a centrifugal mixer, an overhead stirrer, an ultrasonic probe, or placing the reaction mixture in an ultrasonic bath, preferably at room temperature to obtain N-alkyldibromocarbazole. The agitation may be carried out for a period of 8 to 16 h, preferably 8 to 12 h, preferably in an inert atmosphere to prevent any side reaction, to obtain N-alkyldibromocarbazole. The inert gas flow is adjusted to a flow rate of 50 to 350 mL per minute (min), preferably 75 to 300 mL per min, preferably 100 to 250 mL per min, preferably 200 mL per min.

The N-alkyldibromocarbazole thus obtained may be isolated from the solvent mixture using methods known to one skilled in the art, such as filtration, work-up, extraction with organic solvents, distillation, crystallization, column chromatography, and HPLC.

At step 56, the method 50 comprises reacting the N-alkyldibromocarbazole with a distanyl-biselenophene in the presence of a catalyst to form a conjugated polymer.

In a preferred embodiment, the N-alkyldibromocarbazole, the distanyl-biselenophene, an organic solvent, and an inorganic salt are mixed together to form a first mixture. The molar ratio of the N-alkyldibromocarbazole to the distanyl-biselenophene in the first mixture is in the range of 0.5:0.45 to 1.5:0.85, preferably 0.6:0.55 to 1.4:0.80, preferably 0.7:0.50 to 1.3:0.75, preferably 0.8:0.60 to 1.2:0.70, preferably 0.9:0.65 to 1.1:0.65, most preferably 1:0.6. In a preferred embodiment, the distanyl-biselenophene is 5,5'-bis(trimethylstannyl-2,2'-biselenophene). In some embodiments, the first mixture is obtained by mixing N-alkyldibromocarbazole, the distanyl-biselenophene, in the organic solvent, prior to the addition of the inorganic salt. Suitable organic solvents that can be used during mixing are benzene, toluene, xylene, mesitylene, chlorobenzene, tetrahydrofuran (THF), dimethylformamide (DMF), N-methylpyrrolidine (NMP), dimethyl sulfoxide (DMSO), 1,4-dioxane, and $CHCl_3$. In a preferred embodiment, the organic solvent is DMF, preferably degassed, to prevent any side reactions. Suitable inorganic salts include, sodium fluoride (NaF), calcium fluoride (CaF), potassium fluoride (KF), lithium fluoride (LiF), and cesium fluoride (CsF). In a preferred embodiment, the inorganic salt is CsF. The molar ratio of N-alkyldibromocarbazole to the inorganic salt is in the ratio of 1:5 to 5:1, preferably 1:4 to 4:1, preferably 1:3 to 3:1, preferably 1:2 to 2:1, preferably 1:1, most preferably 1:1.1. It is preferred to mix the reactants in an inert atmosphere, such as argon (Ar) and helium (He), most preferably Ar, to obtain the first mixture.

The first mixture is further combined with a metal catalyst and a metal halide to form a second mixture. The metal catalyst preferably comprises palladium. In some embodiments, the catalyst may include other metals such as nickel, iron, molybdenum, copper, cobalt, and the like. In a preferred embodiment, the catalyst comprises a palladium catalyst, such as $Pd(PPh_3)_4$ and $PdCl_2(PPh_3)_2$. In a preferred embodiment, the palladium catalyst is $Pd(PPh_3)_4$. The metal halide is sodium chloride (NaCl), potassium chloride (KCl), potassium iodide (KI), lithium chloride (LiCl), copper(II) chloride ($CuCl_2$), silver chloride (AgCl), calcium chloride ($CaCl_2$), chlorine fluoride (ClF), organohalides, bromomethane ($CH_3Br$), iodoform ($CHI_3$), hydrogen chloride (HCl), hydrogen bromide (HBr), copper (I) iodide, etc. In a preferred embodiment, the metal halide is copper (I) iodide. The molar ratio of the catalyst and the metal halide is in the ratio of 1:5 to 5:1, preferably, 1:4 to 4:1, preferably 1:3 to 3:1, preferably 1:2 to 2:1, more preferably 1:2.

The second mixture is further stirred to form a conjugated polymer. In some embodiments, the second mixture is stirred at a temperature of 40 to 80° C., preferably 45 to 75° C., preferably 50 to 70° C., preferably 55 to 65° C., most preferably 60° C. under an inert gas flow, preferably argon, for 15 to 21 h, preferably 16 to 20 h, preferably 18 h. The inert gas flow is adjusted to a flow rate of 50 to 350 mL per min, preferably 75 to 300 mL per min, preferably 100 to 250 mL per min, preferably 200 mL per min. In some embodiments, the temperature of 40 to 80° C. is obtained at a heating rate preferably up to 20° C./min, or preferably up to 15° C./min, preferably up to 10° C./min, most preferably up to 5° C./min. The stirring is carried out using any suitable means of agitation, for example, an agitator, a vortexer, a rotary shaker, a magnetic stirrer, a centrifugal mixer, an overhead stirrer, an ultrasonic probe, preferably at 60° C. for 18 h to form the conjugated polymer. The conjugated polymer thus obtained has repeating units of Formula 5.

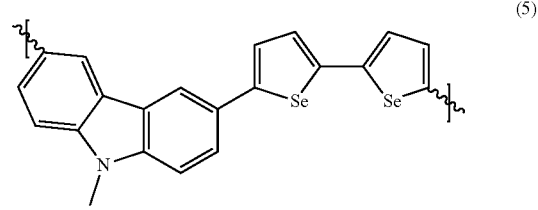

(5)

The conjugated polymer of the present disclosure can be used in various applications, for example, optoelectronics, photonics, bio-imaging, bio-sensing, and nanomedicine. In one embodiment, the conjugated polymer is used in an electrode where the electrode comprises a layer of the conjugated polymer and graphene. In one embodiment, the conjugated polymer contacts the graphene, the graphene being in the form of nanosheets such that the conjugated polymer is dispersed, or disposed on a surface of the graphene nanosheets, and the graphene nanosheets provide support for the conjugated polymer. In yet another embodiment, the conjugated polymer is sandwiched between two surfaces of the graphene nanosheets or is partially or completely enclosed by the graphene nanosheets.

One aspect of the present disclosure is a supercapacitor that contains the conjugated polymer. Preferably, the conjugated polymer is present as a film between cationic and anionic electrodes. The film may function as a membrane separator that is porous to ions. The supercapacitor may contain a liquid, gel, or solid electrolyte present on one or preferably both outer surfaces of the film. A plurality of capacitor units each having a membrane film separator between cathode and anode and each connected to an anode lead or a cathode lead, respectively, can form the structure of the supercapacitor. In other embodiments the supercapacitor contains a coiled electrode unit having two electrode layers separated by the membrane film separator in the long uncoiled direction. The membrane film separator preferably consists of a single layer having a continuous conjugated polymer and optionally a filler material or conductive material such as graphene. Alternately, the membrane film may have two continuous phases made from the conjugated polymer and a conductive material such as graphene.

EXAMPLES

The following examples demonstrate a method for fabricating a conjugated polymer and an electrode comprising the aforementioned conjugated polymer. The examples are provided solely for illustration and are not to be construed as limitations of the present disclosure, as many variations thereof are possible without departing from the spirit and scope of the present disclosure.

Example 1: Alkylation of 9H-carbazole 1.67 grams (g) of 9H-carbazole, 10.0 millimoles (mmol) and 0.84 g of potassium hydroxide (KOH), 15.0 mmol were mixed together in 50 milliliters (mL) of dimethyl sulfoxide (DMSO) under nitrogen ($N_2$) for 10 min. Further, 1-bromohexane, 12 mmol, was added dropwise with stirring. The stirring was continued for 12 h at room temperature. 150 mL of water was added to the reaction mixture, and then precipitated solids were separated by filtration, rinsed with water, and dried on air. Crude products were extracted with dichloromethane (3×50 mL), and combined extracts were rinsed with water and dried over magnesium sulfate ($MgSO_4$). A resulting solution was evaporated, and the residue was used without further purification.

Example 2: Bromination of 9-hexyl-9H-carbazole

A mixture of 9-hexyl-9H-carbazole, 5.00 mmol, and N-bromosuccinimide (NBS), 10.5 mmol was stirred overnight in 100 mL chloroform and 30 mL acetic acid at room temperature, under an atmosphere of argon. Further, the reaction mixture was poured into water, and the organic phase was separated, washed with 50 mL of 5% sodium bicarbonate solution, 50 mL of 5% sodium thiosulphate, and then one more time with 50 mL of water. The organic layer was dried over $MgSO_4$ and filtered. Removal of the solvent followed by column chromatography on silica gel using hexane/dichloromethane (8/1) as an eluent afforded bromocarbazole.

Example 3: Reacting N-alkyldibromocarbazole with Distanyl-Biselenophene in the Presence of a Catalyst A mixture of bromo-carbazole, 2 mmol, and 5,5'-bis(trimethylstannyl)-2,2'-biselenophene, 1.20 mmol was dissolved in 10 mL of dry, degassed dimethylformamide (DMF). Further, cesium fluoride, 2.20 mmol, was added to the above mixture, and a flask containing the above mixture was purged with argon. Furthermore, 0.12 g of a palladium catalyst [$Pd(PPh_3)_4$], 0.10 mmol, and 38 mg of copper(I) iodide, 0.20 mmol were added, and the mixture was stirred at 60° C. under argon. In addition, after 18 h, the reaction mixture was poured into 50 mL of cold methanol, and the product was filtered and dried. The fabricated product exhibited both electrical double-layer capacitance (EDLC) and pseudocapacitance, which boosted the capacitance and provided high power density, as well as the long-term cycle life needed to create reliable electrode materials for robust energy storage supercapacitors. The electrodes fabricated with the product showed efficient charge storage and diminished the reaction time. Moreover, the electrodes exhibited outstanding corrosion resistance and superior compatibility with the electrolytes ($LiClO_4$ and 1-methyl-1-octyl-pyrrolidinium dicyanamide ionic liquid), maximizing the working potential window, the accessible surface area, and the ion diffusion, which subsequently enhanced the device stability.

Numerous modifications and variations of the present disclosure are possible in light of the above teachings. It is therefore to be understood that within the scope of the appended claims, the invention may be practiced otherwise than as specifically described herein.

The invention claimed is:
1. A method of fabricating a conjugated polymer, comprising:
   alkylating 9H-carbazole with 1-bromohexane, in a solvent mixture, to form 9-hexyl-9H-carbazole;
   brominating the 9-hexyl-9H-carbazole to form an N-hexyldibromocarbazole; and
   reacting the N-hexyldibromocarbazole with a distanyl-biselenophene in the presence of a catalyst to form a conjugated polymer having repeating units of formula 5

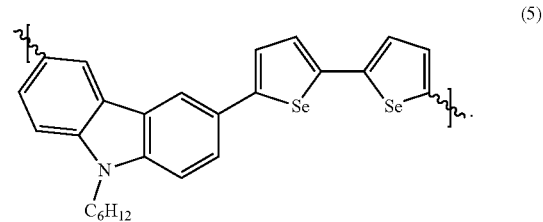

(5)

2. The method of claim 1, wherein the catalyst is a metal catalyst.

3. The method of claim 1, wherein the catalyst comprises palladium.

4. The method of claim 1, wherein the solvent mixture comprises an organic solvent and a strong base.

5. The method of claim 4, wherein the strong base is KOH.

6. The method of claim 4, wherein the organic solvent is selected from the group consisting of dimethylsulfoxide (DMSO), dimethylformamide (DMF), acetonitrile, ethanol, and n-methyl-2-pyrrolidone (NMP).

7. The method of claim 4, wherein the organic solvent is DMSO.

8. The method of claim 1, wherein the distanyl-biselenophene is 5,5'-bis(trimethylstannyl-2,2'-biselenophene).

9. The method of claim 1, further comprising:
mixing the N-hexyldibromocarbazole, the distanyl-biselenophene, an organic solvent, and an inorganic salt to form a first mixture;
combining the first mixture with the catalyst and a metal halide to form a second mixture; and
stirring the second mixture to form the conjugated polymer.

10. The method of claim 1, wherein the inorganic salt is selected from the group consisting of sodium fluoride (NaF), calcium fluoride (CaF), potassium fluoride (KF), lithium fluoride (LiF), and cesium fluoride (CsF).

11. The method of claim 9, wherein the second mixture is stirred at a temperature of 40 to 80° C. under an inert gas flow for 15 to 21 hours.

12. The method of claim 11, wherein the inert gas is Ar.

13. The method of claim 9, wherein the second mixture is stirred at a temperature of 60° C. for 18 hours.

14. The method of claim 9, wherein the first mixture comprises a molar ratio of the N-hexyldibromocarbazole to the distanyl-biselenophene of 0.5:0.45 to 1.5:0.85.

15. The method of claim 14, wherein the molar ratio is 1:0.6.

16. The method of claim 9, wherein the metal halide is copper (I) iodide.

* * * * *